United States Patent [19]

McConnell et al.

[11] Patent Number: 5,117,861

[45] Date of Patent: Jun. 2, 1992

[54] BALL AND SEAT-TYPE VALVE FOR DOWNHOLE ROD PUMP

[76] Inventors: Kenneth R. McConnell, 8532 - 67 Avenue, Edmonton, Alberta, Canada, T6E 0M8; Douglas A. Jensen, 9017 - 60 Street, Edmonton, Alberta, Canada, T6C 3L8

[21] Appl. No.: 529,497

[22] Filed: May 29, 1990

[51] Int. Cl.⁵ .............................................. F16K 15/06
[52] U.S. Cl. ................................. 137/515.7; 137/533.25; 137/533.29
[58] Field of Search ............ 137/515.5, 533.25, 533.29, 137/515.7

[56] References Cited

U.S. PATENT DOCUMENTS 170,974 12/1875 Westwater ................. 137/533.25 X
1,960,970 5/1934 Fina .......................... 137/533.25 X
2,943,639 7/1960 Smith ......................... 137/533.25 X Primary Examiner—Robert G. Nilson
Attorney, Agent, or Firm—E. Peter Johnson

[57] ABSTRACT

The plunger of the valve has a ball of reduced diameter, so that it is inwardly spaced from the ribs of the cage. The plunger is centralized and guided by top and bottom stems attached to the ball and working in apertured webs carried by the cage and seat member. The cage has 3 ribs only, so that the windows are wider. As a result of these features the areas of the flow passage through the valve are increased. The stems are straight-sided and the web openings are circular so fluid may flush out solids packing between the stems and webs. The valve has been improved to increase flow capacity.

2 Claims, 4 Drawing Sheets

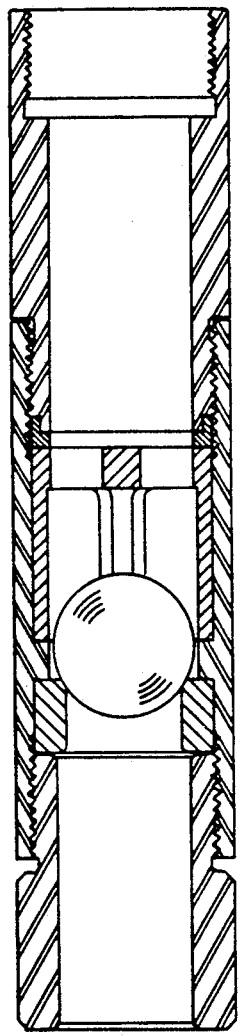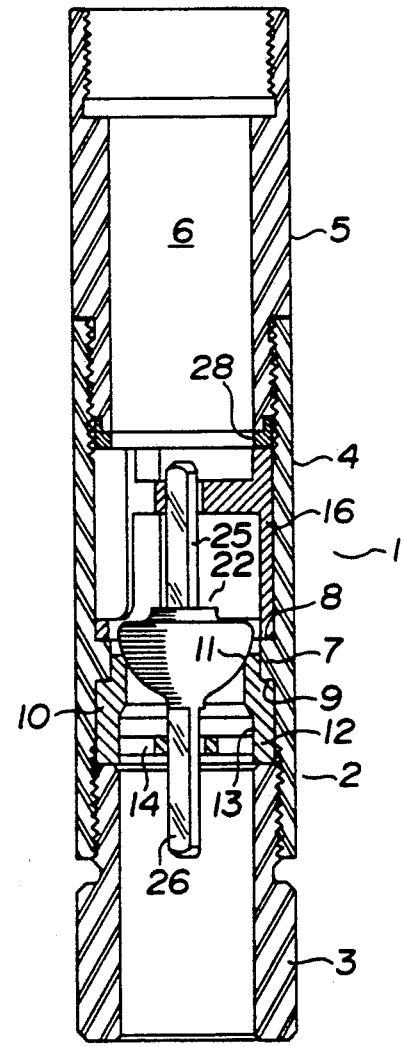
"PRIOR ART"
Fig. 1.
Fig. 2.

BALL AND SEAT-TYPE VALVE FOR DOWNHOLE ROD PUMP

FIELD OF THE INVENTION

The present invention relates to an improved check valve for use in a downhole rod pump of the type used in oilwells.

BACKGROUND OF THE INVENTION

A conventional downhole rod pump incorporates a pair of ball and seat-type check valves, commonly referred to as a standing valve and a travelling valve. A conventional design for this long known valve is shown in FIG. 1.

The conventional valve comprises a bottom nose sub, a barrel and a top sub. These components are screwed together end to end to form the outer housing of the valve. The innards of the valve comprise an annular seat member, a cylindrical cage, and a ball or plunger. The seat member is inserted into the bore of the barrel from the bottom, to abut an inwardly projecting shoulder formed by the barrel wall. The seat member is looked in place and supported from below by the nose sub. The seat member provides a seat against which the ball seals to close off the flow passage extending through the valve. The cage is inserted from the top end of the barrel bore, seats on the barrel shoulder and is locked in place by an annular seal ring and the top sub. The sidewall of the cage typically forms four windows separated by the vertically extending non-removed portions which are referred to as guide ribs. At its upper end the cage has a transverse stop bar. The ball fits loosely in the cage, so that it can easily leave the seat and move up or down within the cage. However, its fit relative to the cage is close enough so that the ribs effectively guide it and prevent it from rattling around excessively in the cage. The stop bar limits the upward movement of the ball.

Now, one aspect of the present invention has to do with increasing the flow capacity of the valve, keeping in mind that the inner diameter of the barrel bore limits the radial dimensions of the valve innards. Stated otherwise, one is precluded from enlarging the outer diameter of the valve innards when one attempts to increase the flow capacity of the valve.

At this point, it is appropriate to identify the constraining flow areas within the valve. FIG. 7 schematically shows them. The flow areas are cross-hatched. More particularly, the valve flow passage comprises, from the bottom up:
the bore of the seat member;
the space left unoccupied when the ball is positioned off the seat within the cage, said space being mainly provided by the windows; and
the space left between the stop bar and the upper ring of the cage.

The question arises: Why would one want to increase the flow capacity of the valve and thus that of the pump itself? The present invention arose in connection with the pumping of heavy oil (although the valve is not limited to that application). A significant problem in pumping viscous heavy oil is that the rod string can only slowly drop down through the column of oil present within the tubing string in which the rod string reciprocates. So one is limited to a certain number of strokes per minute. If the well is capable of producing more fluid than the pump can move, given the limitation on stroking rate, then production is being hampered. In the alternative, if stroking rate can be increased, operating costs will increase as the system is driven harder.

So it has long been appreciated that it would be desirable to improve the flow capacity of the valves used in a given size of downhole pump. However it has also been a condition that if this is to be done, the change in design cannot be accompanied by a significant loss in the useful operating life of the valve.

Turning now to the patent literature known to applicant, the following references are of interest:
U.S. Pat. No. 1,353,409—McEvoy
U.S. Pat. No. 1,860,004—Yardley
U.S. Pat. No. 2,233,649—Stahl et al
U.S. Pat. No. 4,369,808—Hagman

SUMMARY OF THE INVENTION

The invention is directed toward providing a check valve, for a downhole rod pump, characterized by increased flow capacity (relative to the conventional valve) and a desirable extent of durability.

More particularly, in both essential and preferred details, the improved valve involves:
A plunger comprising a valve member that is relatively small in diameter, so that it is inwardly spaced from the cage ribs, thereby increasing the available flow area when the valve member is displaced off the seat and into the cage;
Equipping the now smaller valve member with integral, axially extending, centrally positioned top and bottom stems that extend through aligned apertures in transverse webs carried by each of the seat member and cage. (The stems and valve member together make up the plunger.) The stems and webs cooperate to provide means for guiding and centralizing the valve member in the course of its movement, so as to maintain a consistent path of travel and to ensure that the valve member consistently seats centrally and avoids rattling against the cage ribs (which leads to nicking of the valve member's seal surface);
Since the stems reciprocate in the web apertures, it is desirable to minimize sticking and ensure that solids do not pack solidly between the parts, so that ease of movement is lost. Therefore each stem preferably has a loose fit in its corresponding web and the apertures in the webs are preferably circular and the stem is preferably straight-sided, to create vertically extending openings for fluid flow between the two parts, so that sand particles and the like may be flushed out;
The valve member of the plunger is preferably semi-spherical in form, to permit the upper web to be positioned part way down the cage (so that the top flow area is enlarged), while still enabling the valve member to move far enough off the seat to provide the desired clearance;
The cage is formed with only 2 or 3 ribs, to thereby widen the windows; and
The valve member seal surface and seat are preferably formed with complementary radius-on-radius curvatures, to ensure that a good seal is maintained even though the stems and webs wear and the tolerance between them increases.

With these features incorporated in the check valve, the following advantages have been realized:
the flow area through the valve has been increased;

by guiding the valve member, it remains centered relative to the seat, thereby improving the wear pattern; by guiding the valve member, it cannot rattle in the cage and be nicked; and by using radius-on-radius sealing surfaces, the life of the seal has been extended.

More particularly, when the entire combination was tested, applicant achieved increases in minimum flow area, compared to the conventional design, in the order of the following:

| Cage outside diameter | Flow area increase |
|---|---|
| 1.170" | 22% |
| 1.390" | 48% |
| 1.615" | 20% |
| 1.720" | 32% |

A downhole rod pump was equipped with valves in accordance with the preferred form of the present invention. Previous to the modification, the pump produced 65 MCFD of gas and 57 barrels of water per day. After modification, the pump produced 370 MCFD and 122 barrels of water per day. In this case, in connection with the modification, the pump stroke was increased by 10" (which would account for about 20 barrels of water per day)—however the pumping speed was also reduced from 12 to 7 strokes/minute.

In another test, all pump and stroke factors were kept constant, except for the substitution of a modified valve. Oil production increased from 172 barrels per day to 204 BPD. Broadly stated, the invention is directed to a check valve for use in a downhole rod pump, said valve comprising a top sub, barrel and nose sub threaded together to form a tubular housing, said valve further comprising a cage, plunger and seat member, said cage comprising upper and lower connectors joined by upstanding spaced apart ribs whereby flow windows are formed, said seat member being annular and forming a valve seat, and said plunger comprising a valve member having upper and lower ends and an arcuate seating surface which is adapted to seal against the valve seat, said plunger being non-spring loaded and adapted to be freely displaced up into the cage, thereby opening the flow passage comprising the bores through the nose sub and seat member, the space provided by the windows and between the unseated plunger and the barrel, and the opening extending through the top of the cage and the top sub; the cage having only three substantially equally spaced apart ribs defining windows; the plunger having centrally located upper and lower guide stems extending axially from the upper and lower ends of the valve member; the valve member being generally semi-spherical and sufficiently small so that it is inwardly spaced form the cage ribs; and the seat member and cage each having centrally apertured guide means, extending transversely across the flow passage for receiving and loosely guiding the guide stems to centralize the valve member; one of each guide stem and associated guide means aperture being substantially straight-sided and the other being substantially circular, whereby vertically extending openings are formed between the guide stem and the guide means aperture surface, so that fluid can flow there through to flush out granular solids accumulating therebetween.

DESCRIPTION OF THE DRAWINGS

FIG. 1 is a simplified side sectional view showing a conventional ball and seat-type check valve;

FIG. 2 is a simplified side sectional view showing a check valve in accordance with the invention;

DESCRIPTION OF THE PREFERRED EMBODIMENT

Figure 3:
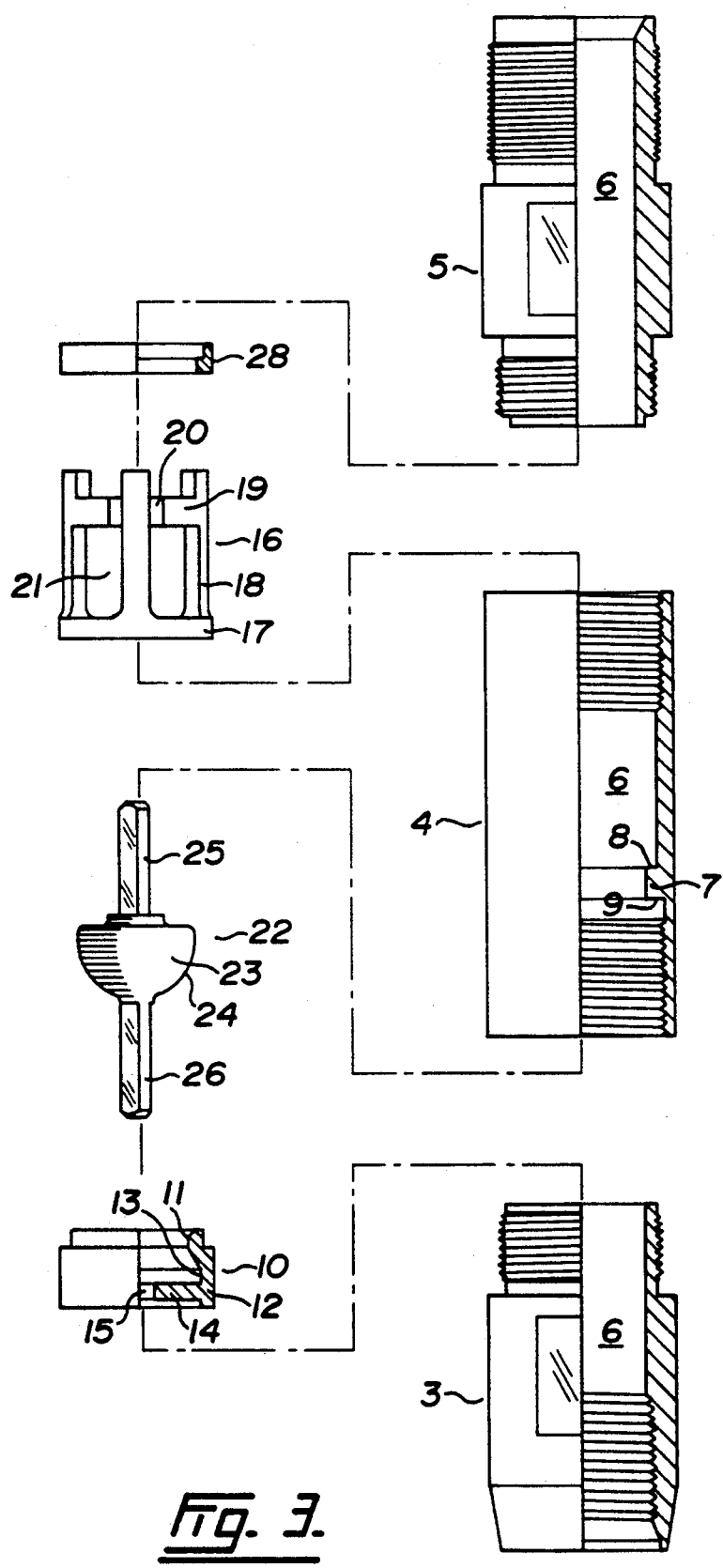
FIG. 3 is an exploded side view showing the components of the new check valve, with broken lines indicating the manner of assembly.
Figure 4:
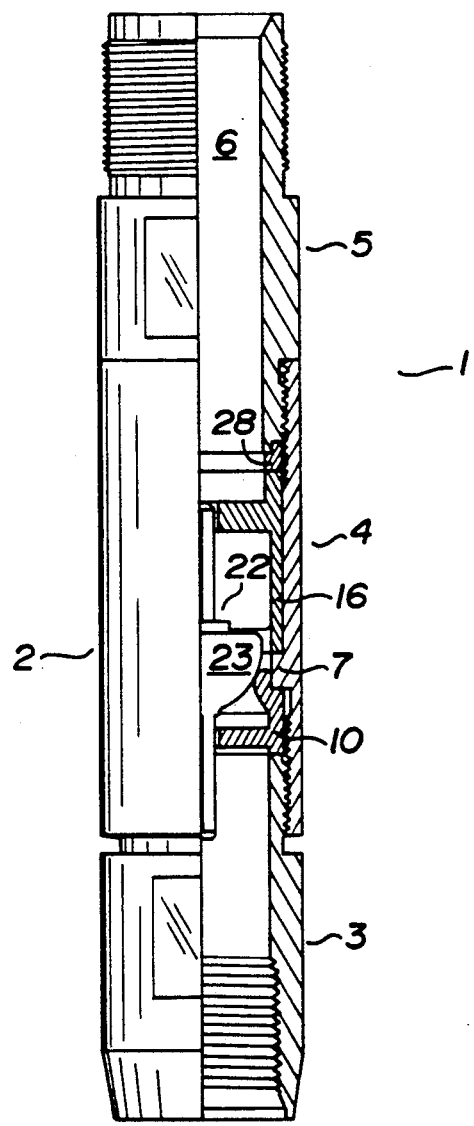
FIG. 4 is an assembled partly sectional side view of the check valve of FIG. 3.
Figure 5:
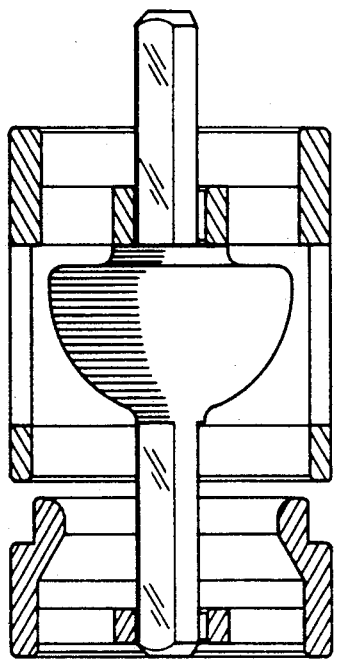
FIGS. 5 and 6 are sectional side views showing the assembly of seat member, plunger and cage in the unseated and seated modes.
Figure 6:
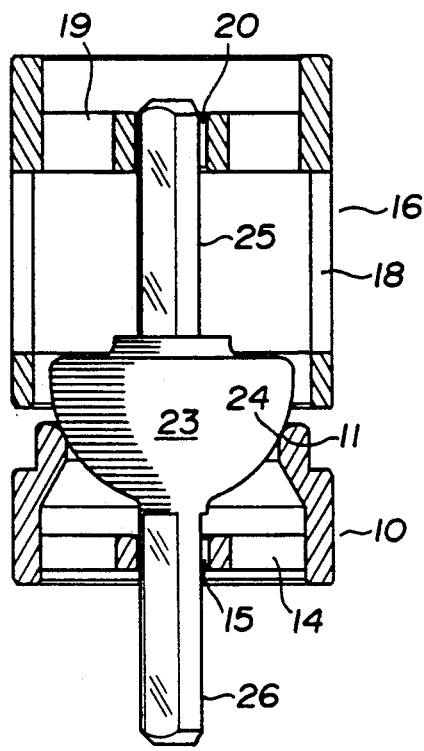
Figure 7A:
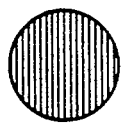
FIGS. 7a–7g identify the three main flow areas of a conventional valve and the four main flow areas of the present valve, with the flow areas cross-hatched.
Figure 7D:
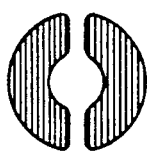
Figure 7B:
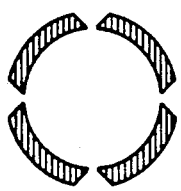
Figure 7E:
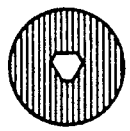
Figure 7F:
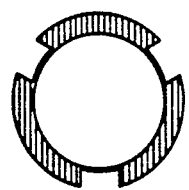
Figure 7C:
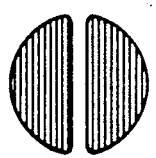
Figure 7G:
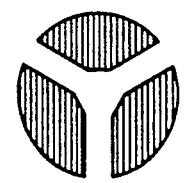

As shown in FIG. 3, the valve 1 comprises an outer housing 2 formed by a nose sub 3, barrel 4 and top sub 5. The housing 2 is generally tubular in form, having a bore 6. The nose sub 3, barrel 4 and top sub 5 screw thread together end to end.

Along its length, the barrel 4 forms an inwardly projecting, reduced diameter portion 7 having top and bottom shoulders 8, 9.

An annular seat member 10 is inserted into the barrel 4 from the bottom, abuts the shoulder 9 and is locked in place by the nose sub 3. The seat member 10 forms an annular rounded seat 11.

The lower portion 12 of the seat member 10 is relatively thin walled, to provide a relatively large bore 13. A web 14 extends diametrically across the bore 13 and is connected with the thinned side wall of the portion 12. The web 14 forms a central aperture 15.

A cage 16 is inserted into the barrel 4 from the top and abuts the shoulder 8. The cage 16 has a connector or bottom ring 17, three upstanding, equally spaced apart ribs 18 and a connector or web 19 connected with the ribs 18 at their upper ends. The web 19 forms a central aperture 20. Windows 21 are formed between the ribs 18.

A plunger 22 is positioned to seat against the seat 11 and to reciprocate within the cage 16. The plunger 22 comprises a semi-spherical valve member 23 having a rounded seal surface 24 adapted to conform with the rounded seat 11 to provide a seal. Stated otherwise, the seal surface 24 and seat 11 have complementary radius-on-radius curvatures. The valve member 23 is relatively small, so that it is inwardly spaced from the ribs 18. The valve member 23 has axially extending, centrally located, upper and lower stems 25, 26. As shown, the stems 25, 26 are straight-sided. Thus openings 15 are formed between the stems 25, 26 and the web apertures 15, 20. The stems 25, 26 have a loose fit in the web apertures 15, 20.

A conventional annular damper 28 is provided to seal between the top sub 5 and the barrel 4.

From the foregoing, it will be noted that:

The plunger valve member 23 is inwardly spaced from the ribs 18, to open up the flow passage between the valve member 23 and the housing 2;

The plunger 21 is guided and centralized by the stems 25, 26 and webs 14, 19;

The valve member 23 is semi-spherical, to open up the flow passage at its upper end; and The space taken up by the cage ribs 18 is reduced by using only three ribs, thereby widening the windows 21.

This combination of features increases the flow capacity of the valve 1 relative to the conventional commercial valve shown in FIG. 1.

It further will be noted that the present valve uses stems and webs to provide the centralizing or guiding function. These parts would have a tendency to seize up if solids pack between them. However, the loose fit and the provision of the openings 27 for flushing have solved this problem in the context of the combination.

And finally, the use of radius-on-radius seal surfaces, coupled with centralizing, has increased the seal life of the ball and seat.

The scope of the invention is defined by the claims now following.

The embodiments of the invention in which an exclusive property or privilege is claimed are defined as follows:

1. A check valve for use in a downhole rod pump, said valve comprising a top sub, barrel and nose sub threaded together to from a tubular housing, said valve further comprising a cage, plunger and seat member, said cage comprising upper and lower connectors joined by upstanding spaced apart ribs whereby flow windows are formed, said seat member being annular and forming a valve seat, and said plunger comprising a valve member having upper and lower ends and an arcuate seating surface which is adapted to seal against the valve seat, said plunger being non-spring loaded and adapted to the freely displaced up into the cage, thereby opening the flow passage comprising the bores through the nose sub and seat member, the space provided by the windows and between the unseated plunger and the barrel, and the opening extending through the top of the cage and the top sub:

the cage having only three substantially equally spaced apart ribs defining windows;

the plunger having centrally located upper and lower guide stems extending axially from the upper and lower ends of the valve member, the valve member being generally semi-spherical and sufficiently small so that it is inwardly spaced from the cage ribs; and the seat member and cage each having centrally apertured guide means, extending transversely across the flow passage, for receiving and loosely guiding the guide stems to centralize the valve member;

one of each guide stem and associated guide means aperture being substantially straight-sided and the other being circular, whereby vertically extending openings are formed between the guide stem and the guide means aperture surface, so that fluid can flow there through to flush out granular solids accumulating therebetween.

2. The valve as set forth in claim 1 wherein:

the cage web is spaced downwardly from the upper ends of the cage ribs.

* * * * *